(12) United States Patent
Zeichner et al.

(10) Patent No.: US 10,089,296 B2
(45) Date of Patent: Oct. 2, 2018

(54) SYSTEM AND METHOD FOR SENTIMENT LEXICON EXPANSION

(71) Applicant: NICE-SYSTEMS LTD., Ra'anana (IL)

(72) Inventors: Naomi Zeichner, Tel-Adashim (IL); Victor Shafran, Ramat Gan (IL)

(73) Assignee: Nice Ltd., Ra'anana (IL)

( * ) Notice: Subject to any disclaimer, the term of this patent is extended or adjusted under 35 U.S.C. 154(b) by 447 days.

(21) Appl. No.: 14/984,498

(22) Filed: Dec. 30, 2015

(65) Prior Publication Data
US 2017/0192955 A1 Jul. 6, 2017

(51) Int. Cl.
*G06F 7/00* (2006.01)
*G06F 17/30* (2006.01)
*G06F 17/27* (2006.01)

(52) U.S. Cl.
CPC ........ *G06F 17/271* (2013.01); *G06F 17/2725* (2013.01); *G06F 17/2775* (2013.01); *G06F 17/30699* (2013.01)

(58) Field of Classification Search
CPC ............... G06F 17/271; G06F 17/2725; G06F 17/2775; G06F 17/30699; G06N 5/04; G06N 7/005; G06N 99/005
See application file for complete search history.

(56) References Cited

U.S. PATENT DOCUMENTS

| | | | |
|---|---|---|---|
| 2009/0048823 A1* | 2/2009 | Liu | G06F 17/2745 704/9 |
| 2009/0125371 A1* | 5/2009 | Neylon | G06F 17/30616 707/739 |
| 2013/0103386 A1* | 4/2013 | Zhang | G06F 17/2785 704/9 |
| 2013/0311485 A1* | 11/2013 | Khan | G06F 17/2785 707/748 |

* cited by examiner

*Primary Examiner* — Azam Cheema
(74) *Attorney, Agent, or Firm* — Pearl Cohen Zedek Latzer Baratz LLP

(57) ABSTRACT

Systems and methods for sentiment lexicon expansion receive at least a domain specific corpus comprising a plurality of words, and a generic sentiment lexicon; parse the plurality of words in the domain specific corpus into a plurality of dependency relations; identify, using one or more syntactic dependency rules and at least one of the plurality of dependency relations, a set of one or more sentiment candidates in the domain specific corpus; filter from the set of one or more sentiment candidates any sentiment candidate having an expected performance below a predefined threshold; sample the filtered set of one or more sentiment candidates to be used in a qualitative evaluation; and, for each sentiment candidate that passes the qualitative evaluation, add the sentiment candidate to the generic sentiment lexicon.

17 Claims, 6 Drawing Sheets

SYSTEM AND METHOD FOR SENTIMENT LEXICON EXPANSION

FIELD OF INVENTION

The present invention relates to the field of enhancing textual analysis. More specifically, the present invention relates to systems and methods for sentiment lexicon expansion.

BACKGROUND

Sentiment lexicon acquisition and expansion relate to the process by which words reflecting sentiment in a text are identified. Identification of sentiments can be very important in textual analysis, Natural Language Processing (NLP), and text mining, as a sentiment may provide a view of or attitude toward a situation, event, or object, and/or reflect feelings or emotions. The task of sentiment lexicon acquisition is typically a labor-intensive and highly manual process. One challenge to automating this process is the problem of sensitivity to the domain of sentiment classification. That is, when classifying textual interactions that originate from different domains using a generic sentiment lexicon the classification accuracy may be poor unless the underlying lexicon used was adapted to the domain. Processes have been developed to identify sentiments in a text. However, these processes are typically manual and very labor intensive. Systems and methods are needed which partially or fully automate the process of sentiment lexicon expansion, which would reduce total cost of operation and increase coverage.

SUMMARY OF EMBODIMENTS OF THE INVENTION

Embodiments of the invention include systems and methods for sentiment lexicon expansion. Embodiments may be performed on a computer, for example, having a processor, memory, and one or more code sets stored in the memory and executing in the processor. In some embodiments, the method may include receiving at least a domain specific corpus including a plurality of words, and a generic sentiment lexicon; parsing the plurality of words in the domain specific corpus into a plurality of dependency relations; identifying, using one or more syntactic dependency rules and at least one of the plurality of dependency relations, a set of one or more sentiment candidates in the domain specific corpus; filtering from the set of one or more sentiment candidates any sentiment candidate having an expected performance below a predefined threshold; sampling the filtered set of one or more sentiment candidates to be used in a qualitative evaluation; and, for each sentiment candidate that passes the qualitative evaluation, adding the sentiment candidate to the generic sentiment lexicon.

In some embodiments, the one or more syntactic dependency rules may include at least one rule in which, if a pair of adverbs found in the domain specific corpus have either an 'and' conjunction dependency relationship or a 'but' conjunction dependency relationship, in which a first adverb of the pair of adverbs was previously included in the generic sentiment lexicon and a second adverb of the pair of adverbs was not previously included in the generic sentiment lexicon, then the second adverb may be identified as a sentiment candidate. In some embodiments, the second adverb may be further identified as having a same polarity as a polarity of the first adverb when the first adverb and the second adverb have an 'and' conjunction dependency relationship; and the second adverb may be further identified as having an opposite polarity to the polarity of the first adverb when the first adverb and the second adverb have a 'but' conjunction dependency relationship.

In some embodiments, the one or more syntactic dependency rules may include at least one rule in which an adverb found in the domain specific corpus which has not been previously included in the generic sentiment lexicon, and which modifies a known feature found in the domain specific corpus, may be identified as a sentiment candidate.

In some embodiments, the one or more syntactic dependency rules may include at least one rule in which an adverb, found in the domain specific corpus that has not been previously included in the generic sentiment lexicon, which modifies a context word found in the domain specific corpus, the context word having as its subject a known feature found in the domain specific corpus, may be identified as a sentiment candidate. Some embodiments may further include identifying a polarity of one or more of the one or more sentiment candidates, in which the polarity may be one of positive and negative. Some embodiments may further include identifying an intensity of the polarity of the one or more of the one or more sentiment candidates.

Some embodiments may further include, for each of the one or more sentiment candidates: if a polarity of the sentiment can be determined by applying the one or more syntactic dependency rules to the domain specific corpus, determining whether the polarity of the sentiment is positive or negative, and associating the sentiment with the determined polarity; and, if a polarity of the sentiment cannot be determined by applying the one or more syntactic dependency rules to the domain specific corpus, identifying the sentiment polarity as undetermined.

Some embodiments may further include evaluating at least one of a recall value and a precision value for an expanded sentiment lexicon, in which the expanded sentiment lexicon includes the generic sentiment lexicon and each sentiment candidate added to the generic sentiment lexicon.

In accordance with further embodiments, systems may be provided which may be configured to perform embodiments of the methods described herein. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5A is a visual representation of an automatically identified sentiment candidate according to at least one embodiment of the invention; and FIG. 5B is a visual representation of an automatically identified sentiment candidate according to at least one embodiment of the invention.

Figure 1:
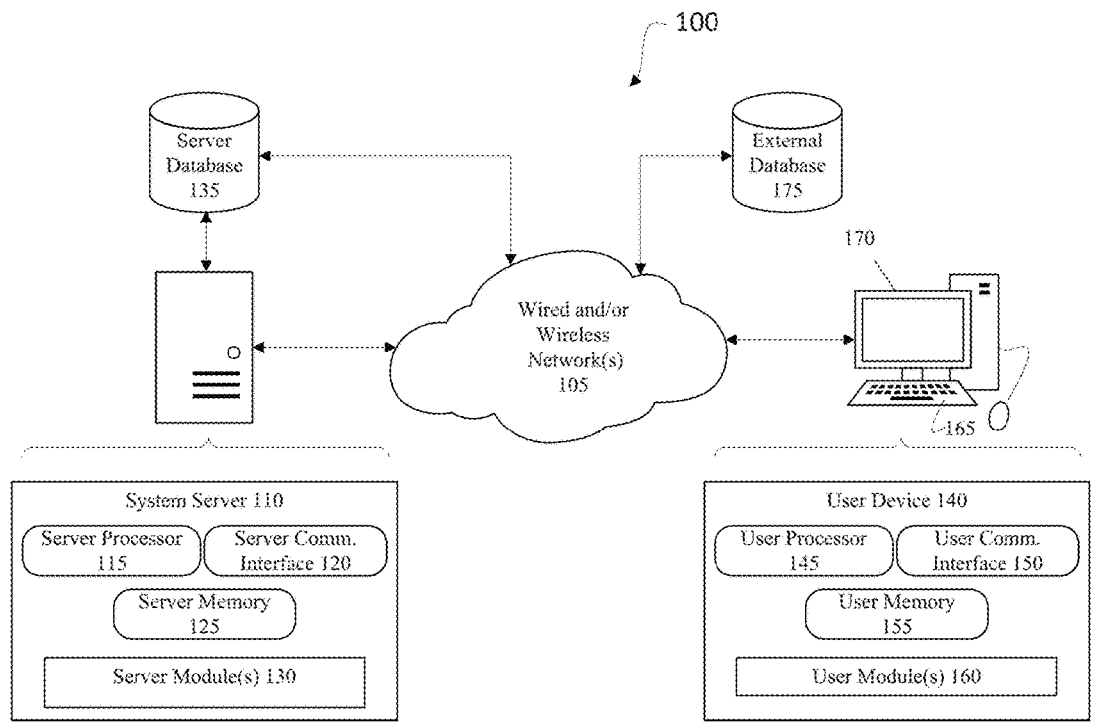
FIG. 1 is a high level diagram illustrating an example configuration of a system for sentiment lexicon expansion according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention describe a semi-supervised method for automating part of this process, thus reducing total cost of operation and increasing coverage. Embodiments of the invention generate a sentiment lexicon which is adapted to the domain. The process uses a set of textual interactions from a specific domain and the generic sentiment lexicon and generates terms that have positive/negative sentiment polarity in this specific domain. Those generated terms may be added to the generic sentiment lexicon producing a sentiment lexicon which is adapted to the domain. This lexicon may then be used in order to classify textual interactions with enhanced accuracy and coverage.

Embodiments of the invention include a process which may include three primary stages:

Candidate phrases extraction—Receiving as input: a domain corpus, a generic sentiment lexicon, and, in some embodiments, a list of entities to which sentiment terms may refer; and automatically outputting sentiment candidate terms and their relevant appearances in the corpus.

Lexicon expansion—Receiving the candidate terms and filtering the terms by implementing a predefined precision threshold.

Lexicon evaluation—A stage in which the candidate terms are evaluated, e.g., on a tagged subset of the corpus, after which either the predefined precision threshold is adjusted or the lexicon is outputted.

These and other features of embodiments of the invention will be further understood with reference to FIGS. 1-5 as described herein.

FIG. 1 shows a high level diagram illustrating an exemplary configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In accordance with embodiments of FIG. 1, the exemplary software modules may include a communication module and other modules as described here. The communication module may be executed by server processor 115 to facilitate communication between system server 110 and the various software and hardware components of system 100, such as, for example, server database 135, client device 140, and/or external database 175 as described herein.

In some embodiments, server modules 130 may include more or less actual modules which may be executed to enable these and other functionalities of the invention. The modules described herein are, therefore, intended to be representative of the various functionalities of system server 110 in accordance with some embodiments of the invention. It should be noted that, in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
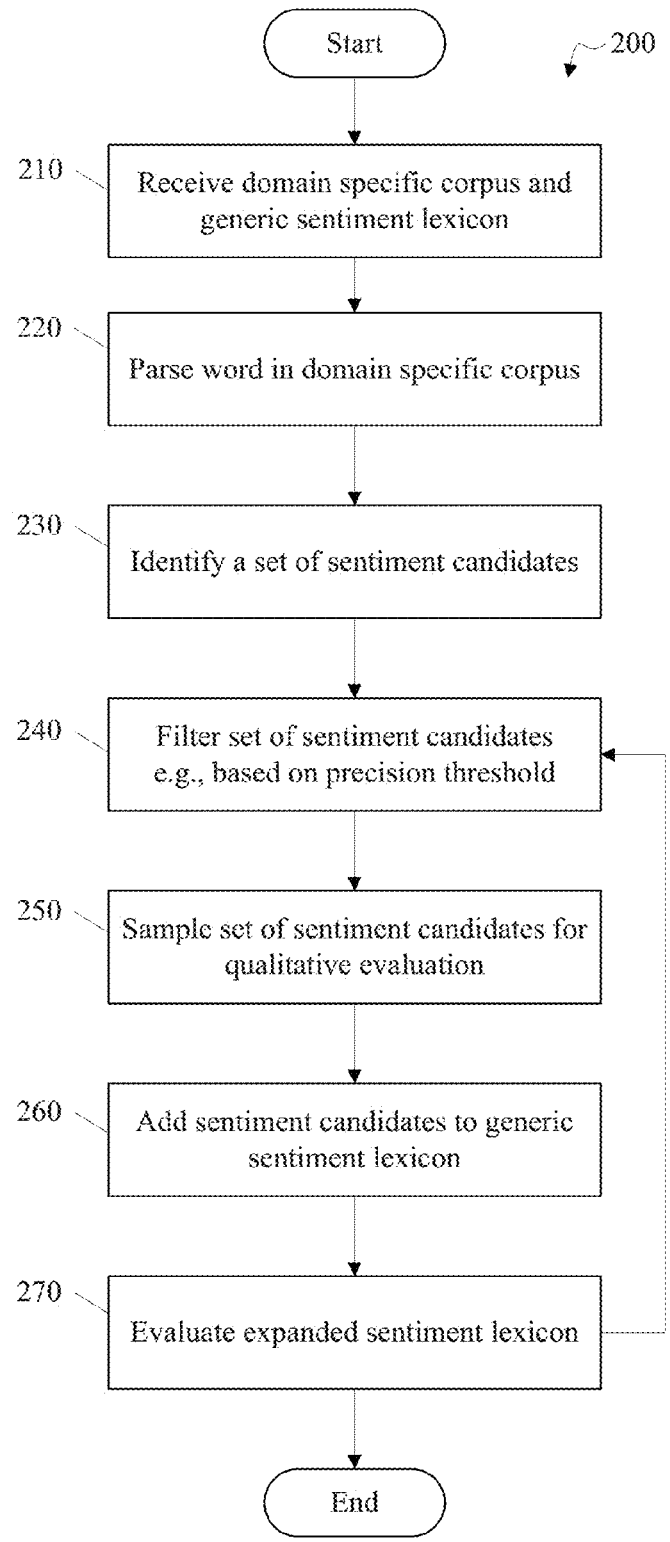
FIG. 2 is a high level diagram illustrating an example configuration of a method for sentiment lexicon expansion according to at least one embodiment of the invention.

FIG. 2 is a high level diagram illustrating an example configuration of a method 200 for sentiment lexicon expansion according to at least one embodiment of the invention. In some embodiments, method 200 may be performed on a computer (e.g., system server 110) having a processor (e.g., server processor 115), memory (e.g., server memory 125), and one or more code sets or software (e.g., server module(s)

130) stored in the memory and executing in or executed by the processor. Method 200 begins at step 210, when the processor receives at least a domain specific corpus including and/or containing a plurality of words, and a generic sentiment lexicon. As described herein, a corpus is typically a large collection of texts and/or documents (e.g., electronically stored and processed), usually composed of a body of writings/text in specific forms/formats (e.g., e-mails) on a particular subject and/or in a particular area of interest. As generally understood in the art, in order to make a corpus more useful for linguistic analysis, the corpus is often subjected to a process known as annotation. An example of annotating a corpus is part-of-speech tagging, or POS-tagging, in which information about part of speech (verb, noun, adjective, etc.) of each word in the corpus is added to the corpus in the form of tags. Another example of corpus annotation is indicating the lemma (base) form of each word.

Some corpora have further structured levels of analysis applied. For example, a number of smaller corpora may be fully parsed. Such corpora are usually called Treebanks or Parsed Corpora. A difficulty of ensuring that the entire corpus is completely and consistently annotated means that these corpora are usually smaller compared to larger corpora, typically containing around one to three million words. Other levels of linguistic structured analysis are possible, including annotations for morphology, semantics and pragmatics.

Furthermore, a domain specific corpus, as understood herein, is a corpus whose content originates from a particular domain. A domain is typically understood as a sphere or area of knowledge, influence, or activity. More generally, a domain may be understood as an area of meaning and the words used to describe it. For example, words used in and/or to describe the medical field may be different than words used in and/or to describe the technology industry. For example, the word "compassionate" may be a highly relevant term in describing an interaction with a member of the medical field, while the same word may have little relevance when describing an interaction with an engineer in the technology field. In some instances, the same word may have partially or entirely different meanings or connotations in different domains. By using a domain specific corpus, embodiments of the invention may more effectively identify sentiments relevant to and/or used in that particular (specific) domain.

A generic sentiment lexicon, as understood herein, is a dictionary, list, or compilation of generic sentiment terms. Rather than being domain-specific, a generic lexicon may consist of sentiment words (sentiments) compiled from a variety of corpora from many different domains. A generic sentiment lexicon may provide enhanced coverage, but accuracy is typically degraded compared to domain-specific lexicon since sentiments in the generic sentiment lexicon are not curated for a particular domain and therefore may contain sentiments and/or definitions which are not germane to a particular domain.

In some embodiments, the generic sentiment lexicon may further include, for one or more terms (e.g., words and/or phrases) in the lexicon, and typically for each term, a matching or corresponding polarity (e.g. negative or positive). A basic task in sentiment analysis is classifying the polarity of a given text at the document, sentence, or entity/feature/aspect level—whether the expressed opinion in a document, a sentence or an entity/feature/aspect is positive, negative, or neutral in nature. As explained herein, in some embodiments the polarity of a known sentiment can be a useful tool in determining the polarity of another (unknown) sentiment. In some embodiments, a polarity may further include a corresponding intensity. In some embodiments, intensity may be a metric indicating the level or extent to which a given sentiment term is positive or negative in nature.

In some embodiments, the processor may receive other or additional data besides or in addition to the domain specific corpus and the generic sentiment lexicon. For example, in some embodiments, the processor may receive a feature word list ('feature list'). A feature list as understood herein, is a list of known features (also referred to as 'entities' or 'attributes') to which sentiment terms may refer. As described herein, in some embodiments, words from a feature list may be used as 'seeds', e.g., sources, starting points, or indicators from which sentiments may be identified by the processor. It should be noted that, in some embodiments, known sentiments from the generic sentiment lexicon may also or alternatively be used as seeds, as explained in detail herein. In such embodiments, a feature list may not be required or used.

At step 220, in some embodiments, e.g., if the domain specific corpus has not yet been parsed or otherwise preprocessed, the processor may parse the plurality of words in the domain specific corpus into a plurality of dependency relations. As understood herein, dependency reflects the notion that linguistic units, e.g. words, may be connected to each other by directed links or relations. Therefore, in some embodiments, the processor may implement a data pre-processing stage on the received domain specific corpus, which may, for example, prepare the domain specific corpus for sentiment extraction, e.g., by identify, detecting, or otherwise determining the various dependency relations contained in the domain specific corpus. In some embodiments, for example as part of the pre-processing, the processor may implement an annotation process, e.g., as described herein. In some embodiments, the processor may parse the data as described herein, e.g., using a syntactic dependency parser, which may, in some embodiments, assign an inventory of functions (e.g., subject, object, modifier, determiner, etc.) as tags or labels for each dependency relation identified in a corpus. These functions may appear as labels on dependencies in dependency grammar tree structures, for example.

Furthermore, in some embodiments, the processor may split or divide the domain specific corpus into at least two data sets: a development set (e.g., consisting of 80% of the corpus data), and a test set (e.g., consisting of 20% of the corpus data). As such, the processor may be configured to perform linguistic analysis on the development set, and preserve the test set for testing the results at a testing step, as described herein.

At step 230, in some embodiments, using one or more syntactic dependency rules and at least one of the plurality of dependency relations, the processor may identify in the domain specific corpus, a set of one or more sentiment candidates. Syntactic dependencies express relations between individual words to describe sentence structure, also referred to as dependency grammar. Typically, syntactic dependencies reflect asymmetrical relations. One word is typically subordinated (dependent) to the other, called the head. In some embodiments syntactic dependencies may be expressed, e.g., visually linking two words (for example, in a tree structure, with links, or with arrows, etc.), and the dependencies may be individualized by labelled links imposing some linguistic conditions on the linked words (e.g., 'subject', etc.). Therefore, in some embodiments, one or more syntactic dependency rules may be implemented which express, reflect, or otherwise identify various syntactic dependencies between two words in the domain specific corpus.

In some embodiments, the one or more syntactic dependency rules may include, for example, a set of so-called base Double Propagation rules, which propagate information through both sentiment words and features (see, e.g., Guang Qiu, Bing Liu, Jiajun Bu and Chun Chen, Expanding Domain Sentiment Lexicon through Double Propagation, Proceedings of the 21st international joint conference on Artificial intelligence, ppg. 1199-1204, which is incorporated herein by reference), and which focus on Direct Relation (DR) dependencies.

Briefly, in the base Double Propagation rules, a direct relation means that one word depends on the other word directly or they both depend on a third word directly. For example, a word A may depend on a word B directly, while words A and B may both directly depend on third word H. Given two DRs between word A and word B (each of which, in some embodiments, may be sentiment words or features), defined rules may capture specific relations as well as the word part-of-speech (POS) information. These rules generally define four extraction tasks: (1) extracting sentiment words using sentiment words; (2) extracting features using sentiment words; (3) extracting sentiment words using features; and (4) extracting features using features. Four types of rules (based on the four types of extractions), described in the base Double Propagation rules, are listed in Table 1 below:

TABLE 1 base Double Propagation Rules

| | Observations | Constraints | Outputs |
|---|---|---|---|
| $R1_1$ | $S_{i(j)} \rightarrow S_{i(j)}\text{-Dep} \rightarrow S_{j(i)}$ | $S_{j(i)} \in \{S\}$, $S_{i(j)}\text{-Dep} \in \{\text{CONJ}\}$, $\text{POS}(S_{i(j)}) \in \{JJ\}$ | $s = S_{i(j)}$ |
| $R1_2$ | $S_i \rightarrow S_i\text{-Dep} \rightarrow H \leftarrow S_j\text{-Dep} \leftarrow S_j$ | $S_i \in \{S\}$, $S_i\text{-Dep} == S_j\text{-Dep}$, $\text{POS}(S_j) \in \{JJ\}$ | $s = S_j$ |
| $R2_1$ | $S \rightarrow S\text{-Dep} \rightarrow F$ | $F \in \{F\}$, $S\text{-Dep} \in \{MR\}$, $\text{POS}(S) \in \{JJ\}$ | $s = S$ |
| $R2_2$ | $S \rightarrow S\text{-Dep} \rightarrow H \leftarrow F\text{-Dep} \leftarrow F$ | $F \in \{F\}$, $S/F\text{-Dep} \in \{MR\}$, $\text{POS}(S) \in \{JJ\}$ | $s = S$ |
| $R3_1$ | $S \rightarrow S\text{-Dep} \rightarrow F$ | $S \in \{S\}$, $S\text{-Dep} \in \{MR\}$, $\text{POS}(F) \in \{NN\}$ | $f = F$ |
| $R3_2$ | $S \rightarrow S\text{-Dep} \rightarrow H \leftarrow F\text{-Dep} \leftarrow F$ | $S \in \{S\}$, $S/F\text{-Dep} \in \{MR\}$, $\text{POS}(F) \in \{NN\}$ | $f = F$ |
| $R4_1$ | $F_{i(j)} \rightarrow F_{i(j)}\text{-Dep} \rightarrow F_{j(i)}$ | $F_{j(i)} \in \{F\}$, $F_{i(j)}\text{-Dep} \in \{\text{CONJ}\}$, $\text{POS}(F_{i(j)}) \in \{NN\}$ | $f = F_{i(j)}$ |
| $R4_2$ | $F_i \rightarrow F_i\text{-Dep} \rightarrow H \leftarrow F_j\text{-Dep} \leftarrow F_j$ | $F_i \in \{F\}$, $F_i\text{-Dep} == F_j\text{-Dep}$, $\text{POS}(F_j) \in \{NN\}$ | $f = F_j$ |

However, the base Double Propagation rules, and other similarly defined rules, focus on identifying sentiment words of the adjective POS type, and avoid identifying sentiment words having other parts of speech. This may be due to the low coverage of other POS, or may be because the algorithms implementing such rules have typically tended to introduce too much noise in the results when including other POS.

While identifying adjectives can be an important part of sentiment extraction, identifying sentiment words of the adverb POS type is also a useful tool in sentiment extraction. As such, in some embodiments, additional rules may be implemented which may identify sentiments of the adverb POS type, as described herein. In some embodiments (e.g., for each document in the corpus), the processor may search for sentiment candidates by trying to apply one or more, and preferably each of the syntactic dependency rules on all the words (e.g., in the document). The adverb POS type rules are provided below, which incorporate the following symbols:

S—Terms in Generic Sentiment Lexicon
F—Features to which sentiment terms may apply
$S_{i(j)}$—Sentiment word in a document
$F_{i(j)}$—Feature word in a document
$\text{POS}(S_{i(j)})$—Part of speech of the word in the document
$S_{i(j)}$-Dep—Syntactic Dependency between the words in the document Adverb Rule 1: Sentiment from Sentiment Adverbs CONJ—In some embodiments of this rule, if a pair of adverbs found in the domain specific corpus have either an 'and' conjunction dependency relationship or a 'but' conjunction dependency relationship, in which a first adverb of the pair of adverbs was previously included in the generic sentiment lexicon and a second adverb of the pair of adverbs was not previously included in the generic sentiment lexicon, then the second adverb is identified as a sentiment candidate. Of course, the order of the first and second adverbs may be of no consequence.

In some embodiments, the second adverb may be further identified as having a same polarity as a polarity of the first adverb when the first adverb and the second adverb have an 'and' conjunction dependency relationship. Conversely, in some embodiments the second adverb may be identified as having an opposite polarity to the polarity of the first adverb when the first adverb and the second adverb have a 'but' conjunction dependency relationship.

It should be noted that the seed in this rule is a known sentiment (e.g., an adverb from the generic sentiment lexicon), and therefore in some embodiments in which this rule is implemented a feature list may not be required or received.

Observation: $S_{i(j)} \rightarrow S_{i(j)}\text{-Dep} \rightarrow S_{j(i)}$
Constraints: $S_{j(i)} \in \{S\}$, $S_{i(j)}\text{-Dep} \in \{\text{CONJ:AND, CONJ:BUT}\}$, $\text{POS}(S_{i(j)}) \in \{RB\}$
Output: $s = S_{i(j)}$
Polarity(s): if $S_{i(j)}\text{-Dep} = \text{CONJ:AND}$ then $\text{Polarity}(S_i)$
if $S_{i(j)}\text{-Dep} = \text{CONJ:BUT}$ then $\text{Flip}(\text{Polarity}(S_i))$

| Example | Jane Smith was extremely professional and dealt with my query efficiently and accurately. |
|---|---|
| $S_i$ | Efficiently (positive) |
| $S_j$ | Accurately (positive) |
| Comment | Efficiently and Accurately have a CONJ: AND relation between them. The polarity will remain the same as defined for Efficiently. |
| Example | Your agent was professional but unfriendly. |
| $S_i$ | Professional (Positive) |
| $S_j$ | Unfriendly (Negative) |
| Comment | Professional and Unfriendly are have a CONJ: BUT relation between them. The polarity will be flipped from the one defined for Professional. |

Adverb Rule 2: Sentiment from Feature Adverb L1—In some embodiments of this rule, an adverb found in the domain specific corpus which has not been previously included in the generic sentiment lexicon and which modifies a known feature found in the domain specific corpus is identified as a sentiment candidate.

It should be noted that the seed in this rule is a known feature (e.g., a feature/entity/aspect from a feature list as described herein), and therefore in some embodiments in which this rule is implemented a feature list may also be received by the processor.

Observation: $S_i \rightarrow S_{i(j)}\text{-Dep}\rightarrow F_j$
Constraints: $F_j \in \{F\}$, $S_{i(j)}\text{-Dep} \in \{\text{ADVMOD, ADVCL, CCOMP, XCOMP}\}$, $\text{POS}(S_i) \in \{\text{RB}\}$
Output: $s=S_i$
Polarity(s): unknown as features are not assigned a polarity

| | |
|---|---|
| Example | Query handled efficiently but a lot of interference on the line and the call ended abruptly as though cut off. |
| $F_i$ | Ended |
| $S_j$ | Abruptly |
| Comment | Abruptly is the ADVMOD of Ended. |
| Example | I was satisfied with my call because they handled the problem effectively the first call. |
| $F_i$ | Handled |
| $S_j$ | Effectively |
| Comment | Effectively is the ADVMOD of Handled. |

Adverb Rule 3: Sentiment from Feature Adverb L2—In some embodiments of this rule, an adverb, found in the domain specific corpus that has not been previously included in the generic sentiment lexicon, which modifies a context word found in the domain specific corpus, the context word having as its subject a known feature found in the domain specific corpus, is identified as a sentiment candidate.

It should be noted that, as with Rule 2, the seed in this rule is a known feature (e.g., a feature/entity/aspect from a feature list as described herein), and therefore in some embodiments in which this rule is implemented a feature list may also be received by the processor.

Observation: $F_i \rightarrow F_i\text{-Dep} \rightarrow H \leftarrow S_j\text{-Dep} \leftarrow S_j$
Constraints: $F_i \in \{F\}$, $F_i\text{-Dep} \in \{\text{SUBJ}\}$, $S_j\text{-Dep} \in \{\text{ADVMOD}\}$, $\text{POS}(H) \in \{\text{VB}\}$, $\text{POS}(S_j) \in \{\text{RB}\}$
Output: $s=S_i$
Polarity(s): unknown as features are not assigned a polarity

| | |
|---|---|
| Example | The lady was very good and explained it very carefully and knew what to look for once I had explained the problem. |
| $F_i$ | Lady |
| H | Explained |
| $S_j$ | Carefully |
| Comments | Lady is the SUBJ of Explained; Carefully is its ADVMOD |
| Example | The call was quick, simple the advisor was well informed on products |
| $F_i$ | Advisor |
| H | Informed |
| $S_j$ | Well |
| Comments | Advisor is the NSUBJPASS of Informed; Well is its ADVMOD |
| Example | Fortunately my phone was reinstated |
| $F_i$ | phone |
| H | reinstated |
| $S_j$ | fortunately |
| Comments | Phone is the NSUBJPASS of reinstated; Fortunately is its ADVMOD. |

In some embodiments, e.g., once the one or more syntactic dependency rules have been implemented, any identified sentiment candidates may be returned, outputted, or otherwise provided, e.g., as represented below, for example, in the form of a list or set. In some embodiments, any identified sentiment candidates may be returned, outputted, or otherwise provided along with their polarity, if known (polarity can be provided only if all known sentiment terms learned from had the same polarity). In some embodiments, a list of all the events in the corpus from which the sentiment candidates were learned may also be provided.

Representative Outputs:
Candidate (String)
Polarity $\in$ {Positive, Negative, Unknown}
Events (list[document id, index in document])

Of course it will be understood by those skilled in the art that, in other embodiments, different and/or other rules may also or alternatively be implemented which likewise identify sentiment candidates, and which may output additional or alternative data used in further embodiments of the invention.

At step 240, the processor may filter from the set of one or more sentiment candidates any sentiments candidates having an expected performance below a predefined threshold. For example, in some embodiments, the processor may calculate or determine an expected precision (as defined below) for a sentiment candidate, and filter out sentiment candidates with low expected performance, e.g., sentiment candidates whose expected precision is below a predefined threshold, or lower than some benchmark or some other predefined variable. In some embodiments, for each sentiment candidate, the processor may calculate candidate expected precision ($P_c$) on the data using the following formula:

$$P_c = \frac{\#\text{indices}}{\#\text{all occurrences of word in corpus}}$$

That is, the expected precision may be defined as the number of indices of a word or phrase from which the sentiment candidate was learned in the corpus (e.g., as reflected in the Events list as described above) divided by the total number of occurrences of that word or phrase in the entire corpus. In some embodiments, indices may reflect specific locations of such words from which the sentiment candidate was learned in the corpus, e.g., specific line, paragraph, page, document, etc., within the corpus. In some embodiments, if $P_c$ is greater than a pre-defined precision threshold $T_c$, then the associated sentiment candidate may be saved, stored, recorded, or otherwise kept for future use or further evaluation and/or processing. Conversely, if $P_c$ is not greater than a pre-defined precision threshold $T_c$, then in some embodiments the associated sentiment candidate may be removed from the set of sentiment candidates or otherwise discarded.

At step 250, the processor may sample the set of one or more sentiment candidates (e.g., the one or more sentiment candidates remaining in the set which were not removed by the filtering process in step 240) for qualitative evaluation. In particular, in some embodiments, for each sentiment candidate, the processor may sample or select (e.g., randomly or based on some predetermined selection model) occurrences of the sentiment candidates in the domain specific corpus, e.g., indicating which occurrence or occurrences were returned in the Events list and which were not. These samplings may then be processed in a qualitative evaluation, e.g., manually by a human reviewer, and/or automatically, for example by implementing a machine learning process or other Artificial intelligence software program.

Figure 3:
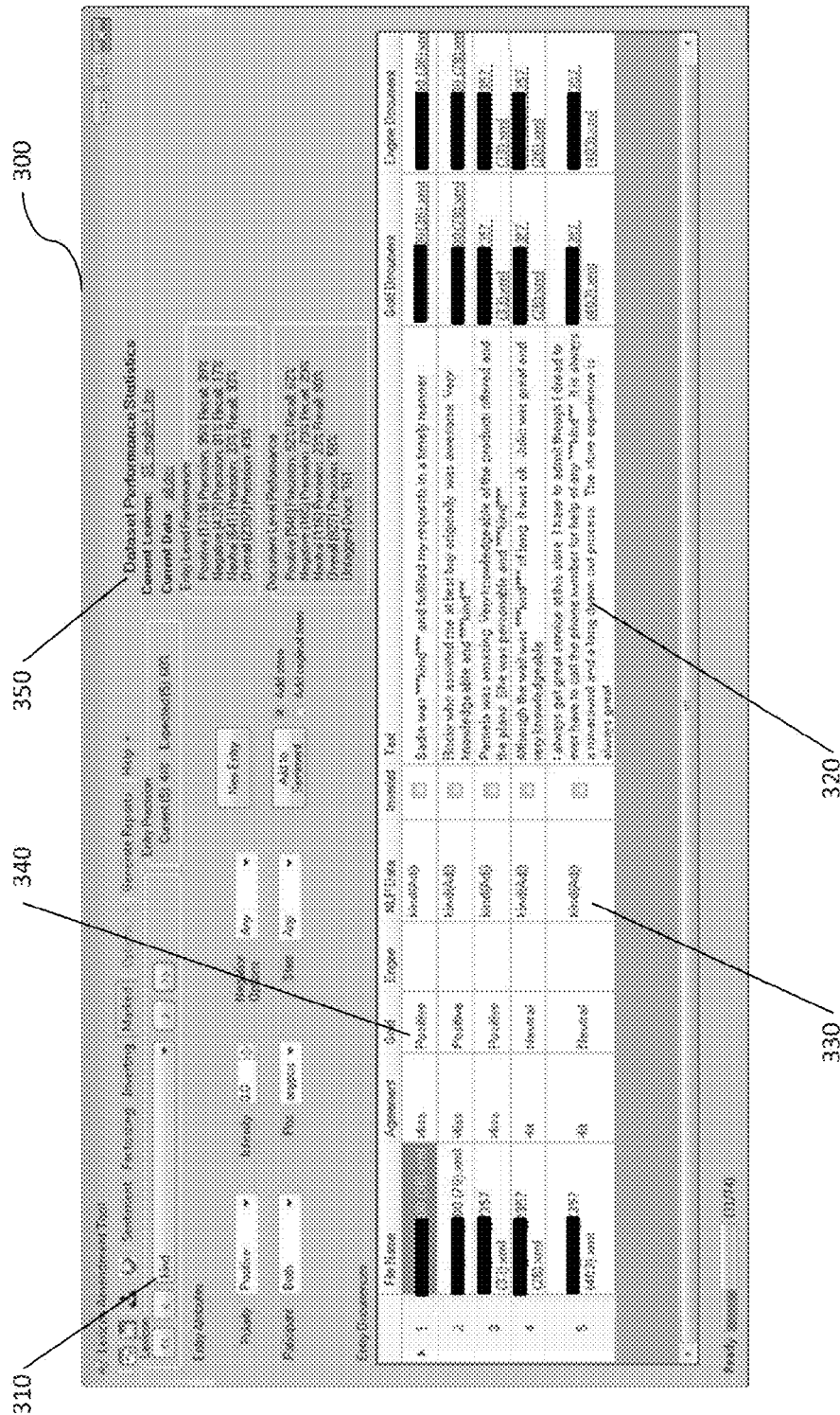
FIG. 3 is a screenshot of an example visual representation of an Events list containing manually tagged sentiment events, according to at least one embodiment of the invention.

By way of example, turning briefly to FIG. 3, a screenshot of an example visual representation 300 of an Events list containing manually tagged sentiment events is provided in accordance with embodiments of the invention. Visual representation 300 shows a sentiment candidate 310 (in this example, the word 'kind'), and the occurrences 320 from which the sentiment candidate 310 was identified (e.g., using one or more of the syntactic dependency rules as described in detail herein), shown in its original context. Also shown are the POS 330 of each occurrence 320, the polarity 340 of each occurrence 320, various dataset performance statistical data 350, etc., among other features. The data reflected in the visual representation 300 may be used in qualitative evaluation process to determine which sentiment candidates should be added to the generic sentiment lexicon (e.g., which sentiment candidates pass the qualitative evaluation) and which sentiment candidates should not be added (e.g., which sentiment candidates fail the qualitative evaluation).

In some embodiments, other occurrences in which a sentiment candidate appears in the corpus but was not identified by implementation of the syntactic dependency rules may also be shown in the Events list. In some embodiments, these occurrences may be intentional 'misses', e.g., where the sentiment candidate has a secondary meaning, depending on the context. For example, the number 'ten' in some contexts may be used qualitatively as a way of expressing approval, e.g., "I gave it a ten", while in other contexts it may be used quantitatively to indicate, e.g., a quantity or a date, etc. In these instances, the qualitative evaluation process may help determine whether such sentiment candidates should be included added to the generic sentiment lexicon, or whether such sentiment candidates would introduce too much noise in the final results.

Returning to FIG. 2, at step 260, for each sentiment candidate that passes the qualitative evaluation, the processor may add the sentiment candidate to the generic sentiment lexicon. In some embodiments, the processor may generate a domain specific sentiment lexicon which includes the terms of the generic sentiment lexicon and the sentiment candidates which pass the qualitative evaluation process (e.g., approved sentiment candidates). In some embodiments, the processor may generate an expanded sentiment lexicon which includes the terms of the generic sentiment lexicon and the sentiment candidates which pass the qualitative evaluation process for a plurality of domains. In some embodiments, e.g., when a polarity is associated with a sentiment candidate, the polarity may also be added to the lexicon. Of course, associated intensities may also be added along with polarities, when available.

At step 270, the processor may evaluate the now-expanded generic sentiment lexicon (e.g., the generic lexicon with the approved sentiment candidates). In some embodiments, the processor may compare the results of running a Sentiment Engine executing embodiments of the invention as described herein on a test set using the expanded lexicon to manual tagging of the same test set. In some embodiments, if the results do not pass pre-defined lexicon precision and/or recall thresholds the process may return to step 240, and the process may be repeated from that step with an adjusted candidate precision threshold. In some embodiments, if the results do pass the pre-defined lexicon precision and/or recall thresholds the processor may indicate (e.g., on a display or other indicator) a successful result, and/or the process ends.

Figure 4:
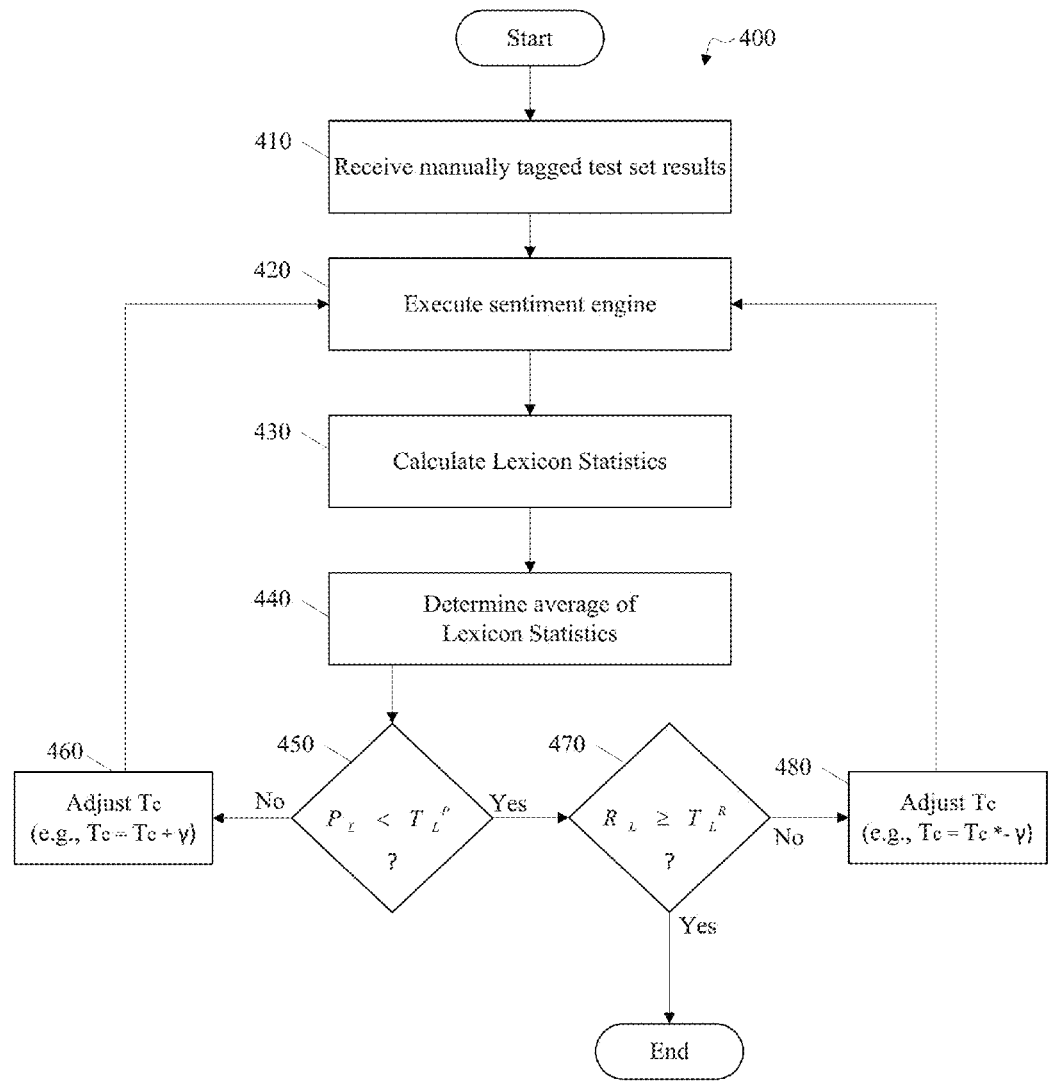
FIG. 4 is a method diagram for evaluating an expanded sentiment lexicon according to at least one embodiment of the invention.

In some embodiments, the processor may enable an evaluation method 400 of the now-expanded generic sentiment lexicon as shown in FIG. 4. It should be noted that in some embodiments, the evaluation method may be an iterative process in which the generic sentiment lexicon is continuously adjusted until, e.g., certain predefined metrics/ thresholds are reached, as described herein. The method 400 starts at step 400 when a manually tagged test set (e.g., results of a manually tagged test set) is received at the processor. In some embodiments, the manual tagging may be, e.g., document level sentiment tagging. At step 420, the processor may execute a Sentiment Engine, in accordance with embodiments of the invention as described in FIG. 2, using the expanded sentiment lexicon (e.g., the generic lexicon with the approved sentiment candidates).

At step 430, the processor may calculate one or more Lexicon Statistics, e.g., based on a comparison of the Sentiment Engine results and the manually tagged results. In some embodiments, calculating the one or more Lexicon Statistics, may include calculating Recall and/or Precision values for at least one, and preferably each, of the polarity classes (Positive, Negative, Neutral). At step 440, the processor may determine an average (e.g., mean, median, etc.) of the one or more Lexicon Statistics (e.g., Precision and/or Recall) calculated for at least one, and preferably each, of the polarity classes, resulting in the following:

$P_L$— Average Lexicon Precision $R_L$— Average Lexicon Recall

At step 450, in some embodiments, the processor may determine whether or not the Average Lexicon Precision is lower than a predefined Lexicon Precision Threshold ($T_L^P$), for example, $P_L < T_L^P$. If $P_L$ is lower than $T_L^P$ the processor may revert back to last used lexicon ($L_{n-1}$, where $L_n$ is the current expanded lexicon), e.g., initially the generic sentiment lexicon, or otherwise indicate that the lexicon as presently constructed does not meet the required threshold. The processor may then (at step 460) adjust the pre-defined precision threshold $T_c$, for example, according to a pre-defined step size γ, with $T_c = T_c + γ$, and continue again at step 420 using the previous iteration of the generic sentiment lexicon ($L_{n-1}$).

At step 470, if the Average Lexicon Precision $P_L$ is equal to or greater than the predefined Lexicon Precision Threshold ($T_L^P$) (e.g., at step 450), the processor may determine whether or not the Average Lexicon Recall ($R_L$) is lower than (e.g., not equal to or greater than) a predefined Lexicon Recall Threshold ($T_L^R$), for example, $P_L \geq T_L^P$, $R_L < T_L^R$. If $R_L$ is lower than ($T_L^R$), the processor may retain the current expanded lexicon ($L_n$), but may then (at step 480) adjust the pre-defined precision threshold $T_c$, for example, according to the predefined step size γ, with $T = T_c^* - γ$, and continue again at step 420 using the current iteration of the generic sentiment lexicon ($L_n$).

In some embodiments, if a balance cannot be reached between the Average Lexicon Precision ($P_L$) and the Average Lexicon Recall ($R_L$), e.g., after a predetermined number of iterations, the processor may return the last used lexicon ($L_{n-1}$), e.g., initially the generic sentiment lexicon, or otherwise indicate that status of the evaluation, and the process ends. In some embodiments, if an acceptable Average Lexicon Precision ($P_L$) score and an acceptable Average Lexicon Recall ($R_L$) score are reached, the processor may return the current expanded lexicon ($L_n$), or otherwise indicate that status of the evaluation, and the process ends.

Figure 5A:
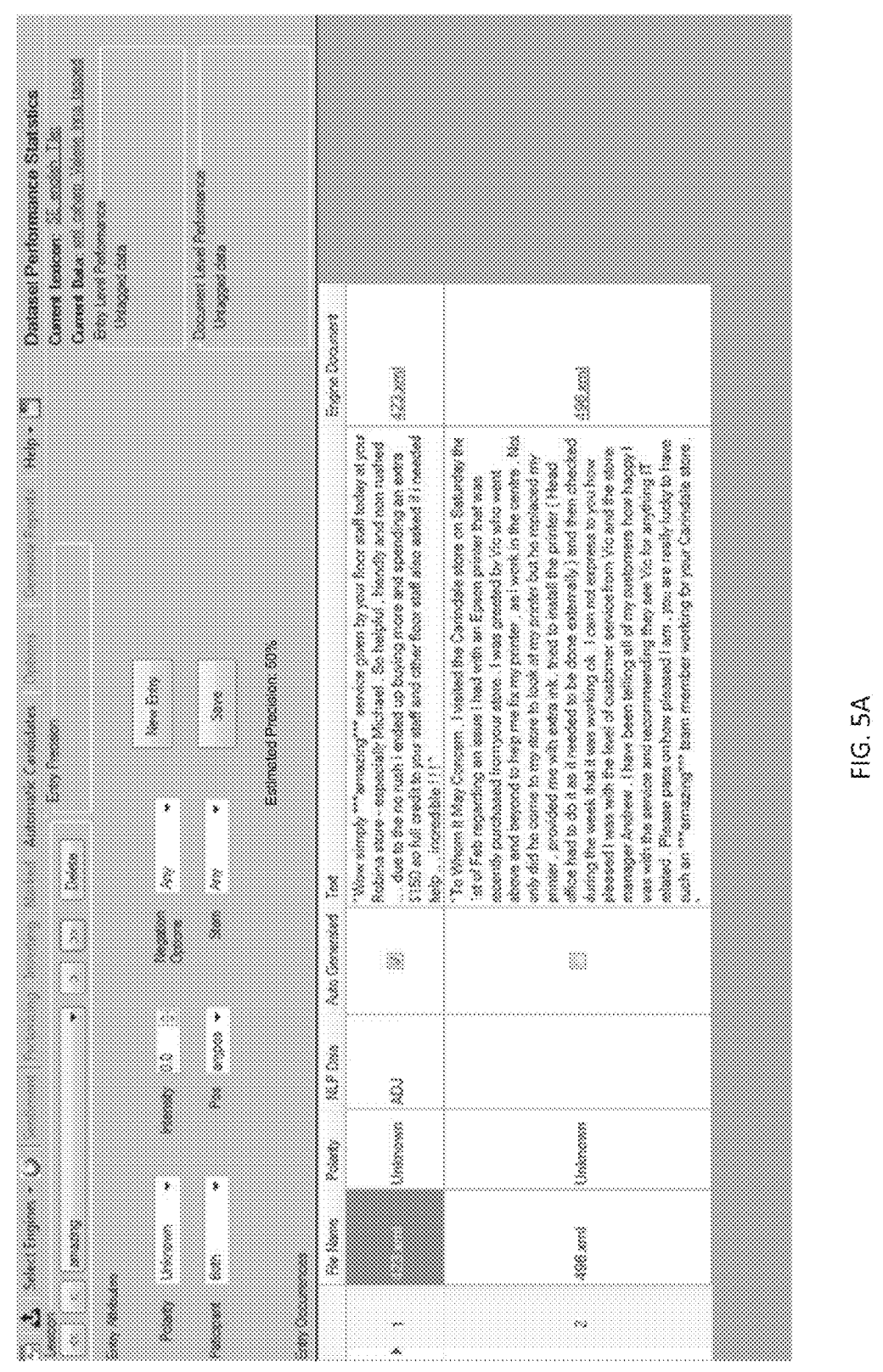
Figure 5B:
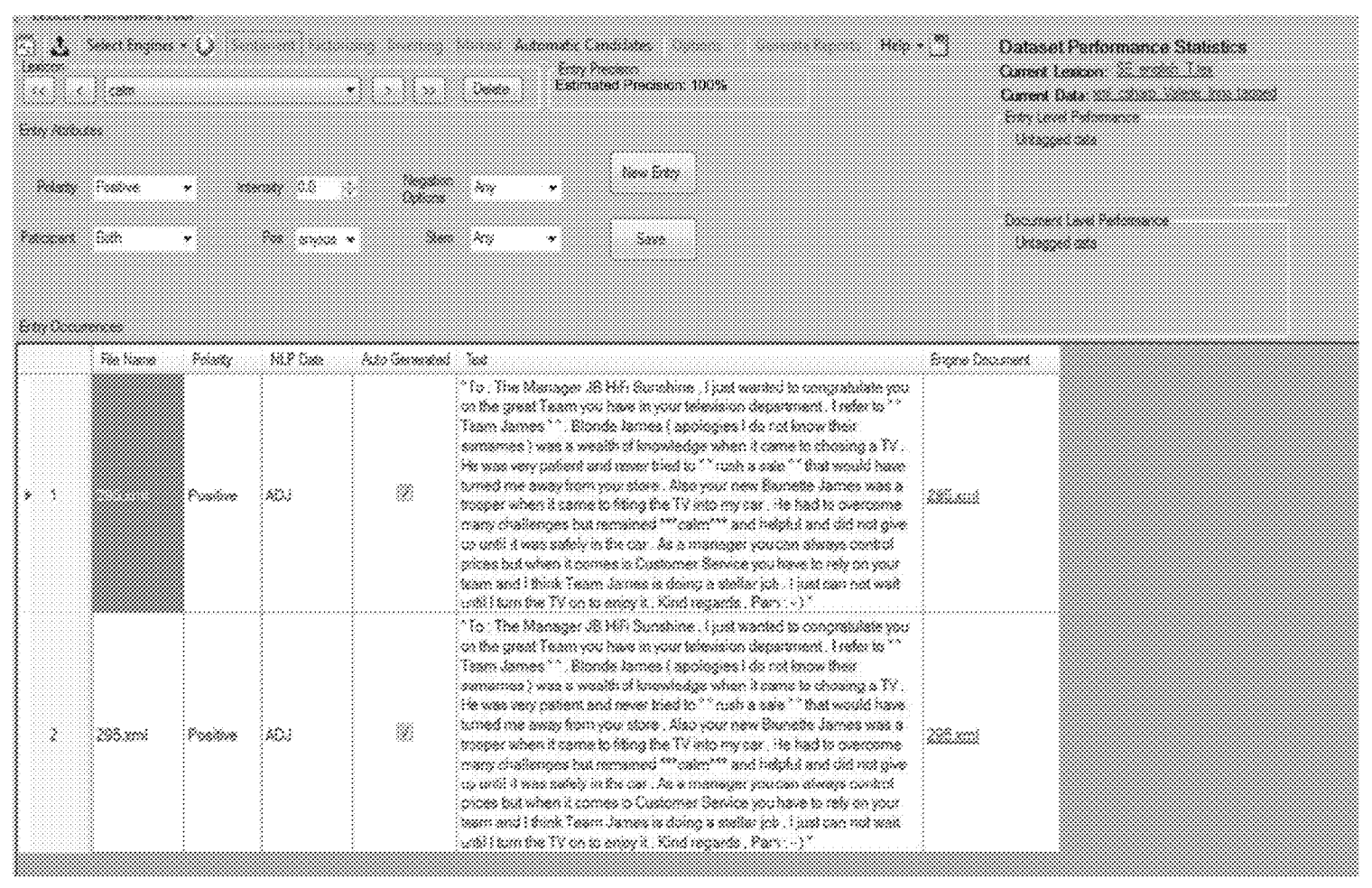

Turning briefly to FIG. 5A, a visual representation of an automatically identified sentiment candidate is shown with unknown polarity and 50% estimated precision, according to embodiments of the invention. Turning briefly to FIG. 5B, a visual representation of an automatically identified sentiment candidate is shown with positive polarity and 100% estimated precision, according to embodiments of the invention.

Embodiments of the invention were evaluated on an example dataset of 3,500 feedback comments. Results are reported on two levels: (1) the precision of the candidates extracted by execution (in a sentiment engine) of the adverb POS type rules described herein; and (2) the results of running the sentiment engine using the generic sentiment lexicon versus using an expanded sentiment lexicon as described herein.

(1) Results Extracted by Executing the Adverb POS Type Rules:

For the purpose of rule evaluation the full list of events discovered by each rule on the test data-set was tagged for correctness.

| Rule # | Rule Name | Accuracy |
| --- | --- | --- |
| Adverb Rule 1 | Sentiment from Sentiment Adverbs CONJ | 70% |
| Adverb Rule 2 | Sentiment from Feature Adverb L1 | 41% |
| Adverb Rule 3 | Sentiment from Feature Adverb L2 | 38% |

(2) Results of Using Generic Sentiment Lexicon Versus Using an Expanded Sentiment Lexicon:

For the purpose of lexicon evaluation, a sample of 300 comments were manually tagged for Document level sentiment. The sentiment engine was run once using the generic sentiment lexicon used as input for the methodology and once using the acquired lexicon and the results of each were compared to the manual tagging.

| Lexicon | Precision |
| --- | --- |
| Generic | 49% |
| Acquired | 71% |

It should be noted that these results are provided for example purposes, and were determined based on one embodiment of the invention. Other embodiments may yield different results.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for sentiment lexicon expansion, performed on a computing device having a processor, memory, and one or more code sets stored in the memory and executing in the processor, the method comprising:
   receiving, by the processor, at least a domain specific corpus comprising a plurality of words, and a generic sentiment lexicon;
   parsing, by the processor, the plurality of words in the domain specific corpus into a plurality of dependency relations;
   identifying, by the processor, using one or more syntactic dependency rules and at least one of the plurality of dependency relations, a set of one or more sentiment candidates in the domain specific corpus;
      wherein the one or more syntactic dependency rules comprises at least one rule in which:
         if a pair of adverbs found in the domain specific corpus have either an 'and' conjunction dependency relationship or a 'but' conjunction dependency relationship, wherein a first adverb of the pair of adverbs was previously included in the generic sentiment lexicon and a second adverb of the pair of adverbs was not previously included in the generic sentiment lexicon, then the second adverb is identified as a sentiment candidate;
   filtering, by the processor, from the set of one or more sentiment candidates any sentiment candidate having an expected performance below a predefined threshold;
   sampling, by the processor, the filtered set of one or more sentiment candidates to be used in a qualitative evaluation; and
   for each sentiment candidate that passes the qualitative evaluation, adding, by the processor, the sentiment candidate to the generic sentiment lexicon.

2. The method as in claim 1, wherein the second adverb is further identified as having a same polarity as a polarity of the first adverb when the first adverb and the second adverb have an 'and' conjunction dependency relationship; and
   wherein the second adverb is further identified as having an opposite polarity to the polarity of the first adverb when the first adverb and the second adverb have a 'but' conjunction dependency relationship.

3. The method as in claim 1, wherein the one or more syntactic dependency rules comprises at least one rule in which:
   an adverb found in the domain specific corpus which has not been previously included in the generic sentiment lexicon and which modifies a known feature found in the domain specific corpus is identified as a sentiment candidate.

4. The method as in claim 1, wherein the one or more syntactic dependency rules comprises at least one rule in which:
   an adverb, found in the domain specific corpus that has not been previously included in the generic sentiment lexicon, which modifies a context word found in the domain specific corpus, the context word having as its subject a known feature found in the domain specific corpus, is identified as a sentiment candidate.

5. The method as in claim 1, further comprising:
   identifying a polarity of one or more of the one or more sentiment candidates, wherein the polarity is one of positive and negative.

6. The method as in claim 5, further comprising:
   identifying an intensity of the polarity of the one or more of the one or more sentiment candidates.

7. The method as in claim 1, further comprising:
   for each of the one or more sentiment candidates:
      if a polarity of the sentiment can be determined by applying the one or more syntactic dependency rules to the domain specific corpus, determining by the processor whether the polarity of the sentiment is positive or negative, and associating the sentiment with the determined polarity; and
      if a polarity of the sentiment cannot be determined by applying the one or more syntactic dependency rules to the domain specific corpus, identifying the sentiment polarity as undetermined.

8. The method as in claim 1, further comprising:
evaluating, by the processor, at least one of a recall value and a precision value for an expanded sentiment lexicon, wherein the expanded sentiment lexicon comprises the generic sentiment lexicon and each sentiment candidate added to the generic sentiment lexicon.

9. A system for sentiment lexicon expansion, comprising:
a processor;
a memory; and
one or more code sets stored in the memory and executing in the processor, which, when executed, configure the processor to:
receive at least a domain specific corpus comprising a plurality of words, and a generic sentiment lexicon;
parse the plurality of words in the domain specific corpus into a plurality of dependency relations;
identify, using one or more syntactic dependency rules and at least one of the plurality of dependency relations, a set of one or more sentiment candidates in the domain specific corpus;
wherein the one or more syntactic dependency rules comprises at least one rule in which:
if a pair of adverbs found in the domain specific corpus have either an 'and' conjunction dependency relationship or a 'but' conjunction dependency relationship, wherein a first adverb of the pair of adverbs was previously included in the generic sentiment lexicon and a second adverb of the pair of adverbs was not previously included in the generic sentiment lexicon, then the second adverb is identified as a sentiment candidate;
filter from the set of one or more sentiment candidates any sentiment candidate having an expected performance below a predefined threshold;
sample the filtered set of one or more sentiment candidates to be used in a qualitative evaluation; and
for each sentiment candidate that passes the qualitative evaluation, add the sentiment candidate to the generic sentiment lexicon.

10. The system of claim 9, wherein the second adverb is further identified as having a same polarity as a polarity of the first adverb when the first adverb and the second adverb have an 'and' conjunction dependency relationship; and
wherein the second adverb is further identified as having an opposite polarity to the polarity of the first adverb when the first adverb and the second adverb have a 'but' conjunction dependency relationship.

11. The system of claim 9, wherein the one or more syntactic dependency rules comprises at least one rule in which:
an adverb found in the domain specific corpus which has not been previously included in the generic sentiment lexicon and which modifies a known feature found in the domain specific corpus is identified as a sentiment candidate.

12. The system of claim 9, wherein the one or more syntactic dependency rules comprises at least one rule in which:
an adverb, found in the domain specific corpus that has not been previously included in the generic sentiment lexicon, which modifies a context word found in the domain specific corpus, the context word having as its subject a known feature found in the domain specific corpus, is identified as a sentiment candidate.

13. The system of claim 9, wherein the one or more code sets further configure the processor to:
identify a polarity of one or more of the one or more sentiment candidates, wherein the polarity is one of positive and negative.

14. The system of claim 13, wherein the one or more code sets further configure the processor to:
Identify an intensity of the polarity of the one or more of the one or more sentiment candidates.

15. The system of claim 9, wherein, for each of the one or more sentiment candidates, the one or more code sets further configure the processor to:
if a polarity of the sentiment can be determined by applying the one or more syntactic dependency rules to the domain specific corpus, determine whether the polarity of the sentiment is positive or negative, and associate the sentiment with the determined polarity; and
if a polarity of the sentiment cannot be determined by applying the one or more syntactic dependency rules to the domain specific corpus, identify the sentiment polarity as undetermined.

16. The system of claim 9, wherein the one or more code sets further configure the processor to:
evaluate at least one of a recall value and a precision value for an expanded sentiment lexicon, wherein the expanded sentiment lexicon comprises the generic sentiment lexicon and each sentiment candidate added to the generic sentiment lexicon.

17. A method for sentiment lexicon expansion, performed on a computing device having a processor, memory, and one or more code sets stored in the memory and executing in the processor, the method comprising:
receiving, by the processor, at least a domain specific corpus comprising a plurality of words, and a generic sentiment lexicon;
parsing, by the processor, the plurality of words in the domain specific corpus into a plurality of dependency relations;
identifying, by the processor, using one or more syntactic dependency rules and at least one of the plurality of dependency relations, a set of one or more sentiment candidates in the domain specific corpus;
wherein the one or more syntactic dependency rules comprises at least one of:
a first rule in which, if a pair of adverbs found in the domain specific corpus have either an 'and' conjunction dependency relationship or a 'but' conjunction dependency relationship, wherein a first adverb of the pair of adverbs was previously included in the generic sentiment lexicon and a second adverb of the pair of adverbs was not previously included in the generic sentiment lexicon, then the second adverb is identified as a sentiment candidate;
a second rule in which an adverb found in the domain specific corpus which has not been previously included in the generic sentiment lexicon and which modifies a known feature found in the domain specific corpus is identified as a sentiment candidate; and
a third rule in which an adverb, found in the domain specific corpus that has not been previously included in the generic sentiment lexicon, which modifies a context word found in the domain specific corpus, the context word having as its subject a known feature found in the domain specific corpus, is identified as a sentiment candidate;

identifying, by the processor, a polarity of one or more of the one or more sentiment candidates, wherein the polarity is one of positive and negative;

filtering, by the processor, from the set of one or more sentiment candidates any sentiment candidate having an expected performance below a predefined threshold; and adding, by the processor, the filtered set of one or more sentiment candidates to the generic sentiment lexicon.

\* \* \* \* \*